United States Patent [19]
Cheng et al.

[11] Patent Number: 5,848,098
[45] Date of Patent: Dec. 8, 1998

[54] PERSONAL BASE STATION EXTENSION CALLING ARRANGEMENT

[75] Inventors: James Y. Cheng, Princeton Junction, N.J.; Shao-Ning Chou, Bethlehem, Pa.; Peter Kroon, Green Brook, N.J.

[73] Assignee: Lucent Technologies, Inc., Murray Hill, N.J.

[21] Appl. No.: 679,404

[22] Filed: Jul. 9, 1996

[51] Int. Cl.$^6$ .............................. H04B 1/38; H04L 5/16
[52] U.S. Cl. ..................... 375/220; 375/219; 375/220; 375/221; 455/73; 455/74.1; 455/403; 455/414; 455/416; 455/417; 455/465; 455/560
[58] Field of Search ................... 375/220, 219, 375/221, 222; 455/73, 74, 74.1, 561, 560, 550, 555, 403, 414, 416, 417, 422, 426, 465, 462, 463, 464; 348/7, 12, 13; 340/825.51, 825.5

[56] References Cited

U.S. PATENT DOCUMENTS

| | | | |
|---|---|---|---|
| 5,263,045 | 11/1993 | Schilling | 375/1 |
| 5,297,142 | 3/1994 | Paggeot et al. | 370/85.6 |
| 5,297,190 | 3/1994 | Ito | 379/58 |
| 5,325,420 | 6/1994 | Kikuchi | 379/61 |
| 5,465,391 | 11/1995 | Toyryla | 455/33.4 |
| 5,594,782 | 1/1997 | Zicker et al. | 379/63 |
| 5,675,629 | 10/1997 | Raffel et al. | 379/58 |

*Primary Examiner*—Stephen Chin
*Assistant Examiner*—Michael W. Maddox

[57] ABSTRACT

A base station includes a digital signal processor, the base station operable to communicate with at least first and second wireless terminals using compressed digital signals modulated onto a radio frequency carrier, the base station further operable to communicate with an external network to facilitate a call between one or more wireless terminals and another party connected to the external network. The digital signal processor is operably connected to receive compressed signals from and provide compressed signals to the first and second wireless terminals, and further operably connected to communicate uncompressed signals with the external network. The digital signal processor is programmed to execute instructions to perform the following functions: monitor a first signal, the first signal received from the first wireless terminal; monitor a second signal, the second signal received from the second wireless terminal; monitor a network signal, the network signal received from the external network; select using predetermined criteria a priority signal, the priority signal comprising one of the first signal, the second signal and the network signal; and perform either a compression or decompression process on the priority signal and then provide the processed priority signal to at least one of the first wireless terminal, second wireless terminal and external network.

29 Claims, 5 Drawing Sheets

PERSONAL BASE STATION EXTENSION CALLING ARRANGEMENT

FIELD OF THE INVENTION

The present invention relates generally to the field of telephony, and in particular, to the field of personal wireless communications.

BACKGROUND OF THE INVENTION

Subscribers to a commercial wireless network, such as a cellular network, use wireless terminals, such as cellular telephones, to communicate using radio frequency signals. The commercial wireless network is composed of, among other things, a plurality of geographically dispersed base stations that carry on radio frequency signal communication with the wireless terminals. The wireless network thereafter communicates the subscribers' signals to other wireless network subscribers, or to subscribers of an external communications network, such as a public switched telephone network ("PSTN").

Typically, in the past, wireless terminals designed for use with a commercial wireless network were limited to use only in conjunction with that or a similar wireless network. As a result, every time the wireless terminal was used, the subscriber incurred wireless network service charges in addition to ordinary telephone service charges. Recently, however, telecommunication devices known as personal base stations have been developed that allow such wireless terminals to communicate over the PSTN (or other external network) without using service from a wireless network service provider. Personal base stations provide a communication link to wireless terminals using radio signals in the frequency band normally allocated to the commercial cellular or wireless service. To facilitate communication with the PSTN or other external network, a personal base station ("PBS") is connected directly to the external network in the same or similar manner as other customer premise equipment, for example, a single telephone line or private branch exchange. In this manner, the PBS enables wireless terminals to enjoy the benefits of cordless communications without incurring the charges of a commercial wireless network service provider. Moreover, when the wireless terminal is moved out from the proximity of the PBS and into the proximity of a commercial wireless network, it may then provide telephony services using the commercial wireless network.

The PBS, therefore, is useful in a residence or office environment. Consider a residence in which one of the inhabitants owns a cellular telephone and is a subscriber to a cellular network. When the subscriber leaves the residence and attends to activities outside the residence, the subscriber may utilize the cellular phone by communicating through the cellular network. While using the cellular network, the subscriber incurs service charges associated with such cellular service. When the inhabitant is located within the residence, however, the inhabitant may use the cellular phone by communicating through the PBS, which avoids the cellular network provider charges.

Special problems have arisen with the implementation of PBS equipment, and, particularly, PBS equipment that is designed for use with digital wireless terminals. One problem relates to the implementation of extension calling in a PBS. An extension call is a situation in which two parties within a residence use separate telephones that are connected to the same line in order to participate in a telephone call with a third party. A PBS extension call is a situation in which two parties with wireless terminals communicate through a single PBS to carry on a telephone call with a third party, the third party being connected to the external network.

At present, one problem with providing PBS extension calling is related to equipment cost. Presently, PBS extension calling is prohibitively expensive because of the processing power that is required to perform signal processing on each of the wireless terminal signals. Standard digital wireless terminals (and base stations) communicate using compressed digital signals. Compressed digital signals are digital signals that have been encoded or compressed using one of a plurality of digital signal compression techniques in order to conserve bandwidth. While wireless networks typically use such compressed digital signals, the PSTN and most other communication networks utilize uncompressed analog or digital signals. Accordingly, a PBS must be able to compress and decompress call signals transmitted between wireless terminals and the external network. The compression/decompression devices and circuits used by the PBS to convert between the compressed and uncompressed signals for ordinary two-party telephone calls constitute a significant portion of the PBS cost.

According to the prior art, a PBS effectuates an extension call by separately decompressing the signals provided by the two wireless terminals, combining the decompressed signals with signals provided by the party connected to the external telephone network, and then providing the combined signal to each of the three parties. The wireless terminal signals must be decompressed because signals cannot be easily combined while in compressed format. Furthermore the combined signal must be re-compressed before providing the signal to each of the wireless terminals. By this method, each party may communicate contemporaneously, such as in a full duplex telephone line. The drawback to this approach is that both wireless terminals' signals must be decompressed contemporaneously, and furthermore re-compressed, in real time. Providing equipment having the capability of performing such contemporaneous decompression and compression processing greatly increases the PBS cost.

Another drawback to the PBS extension calling technique described above is the signal degradation associated with multiple compression/decompression steps. Each compression and/or decompression process degrades the signal quality to some degree. Because the prior art method described above involves decompressing the two wireless terminals' signals, combining the signals, and then re-compressing the combined signal, the original wireless terminals' signals suffer significant degradation.

As a consequence, the above-described method of performing multiple contemporaneous compression/compression steps to accommodate PBS extension calling significantly increases the costs of the PBS. Because as a general matter extension calling is relatively infrequently used, the increased cost cannot be justified. Accordingly, there is a need for a more cost-effective approach for providing PBS extension calling involving two wireless terminals. There is furthermore a need for an approach to PBS extension calling that reduces signal quality degradation.

SUMMARY OF THE INVENTION

The present invention includes methods and apparatus for PBS extension calling between two wireless subscribers and a third party connected through an external communication network that requires reduced processing power. The present invention can provide such extension calling with reduced processing power by utilizing so-called simplex extension calling in which only one of the parties to the call are permitted to communicate an outgoing signal at any one instant. In other words, only one party may be heard at a time. By providing simplex PBS extension calling using the methods and apparatus of the present invention, only one signal need be compressed or decompressed at any one time.

An exemplary embodiment of the present invention includes a digital signal processor for use in a base station, said base station operable to communicate with at least first and second wireless terminals using compressed digital signals modulated onto a radio frequency carrier, said base station further operable to communicate with an external communication network to facilitate a call between one or more wireless terminals and another party connected to the external communication network. The digital signal processor is operably connected to receive compressed signals from and provide compressed signals to the first and second wireless terminals, and further operably connected to communicate uncompressed signals with the external communication network. According to the present invention, the digital signal processor is programmed to execute instructions to perform the following functions: monitor a first signal, the first signal received from the first wireless terminal; monitor a second signal, the second signal received from the second wireless terminal; monitor a network signal, the network signal received from the external communication network; select using predetermined criteria a priority signal, said priority signal comprising one of the first signal, the second signal and the network signal; and perform either a compression or decompression process on the priority signal and then provide the processed priority signal to at least one of the first wireless terminal, second wireless terminal and external communication network. Under some circumstances the processor may also provide the unprocessed priority signal to one or more of the first and second wireless terminals.

In further detail, if the selected priority signal is the first (or second) signal, which is in compressed format, then the processor performs a decompression process on the priority signal, and provides the decompressed priority signal to the external network. The processor then also provides the unprocessed (compressed) priority signal to the first and second wireless terminals. If, however, the selected priority signal is the network signal, then the processor performs a compression process and provides the processed priority signal to both the first and second wireless terminals.

Accordingly, the present invention selects one of the signals from the three parties and provides that signal to at least one of the other parties, and typically at least the other two parties. As a result, the processor only performs a compression or decompression process on one of the signals at any one time, thereby conserving processing power while providing service to the extension call.

The above described features and advantages, as well as others, will become readily apparent to those of ordinary skill in the art by reference to the following detailed description and accompanying drawings.

DETAILED DESCRIPTION

Figure 1:
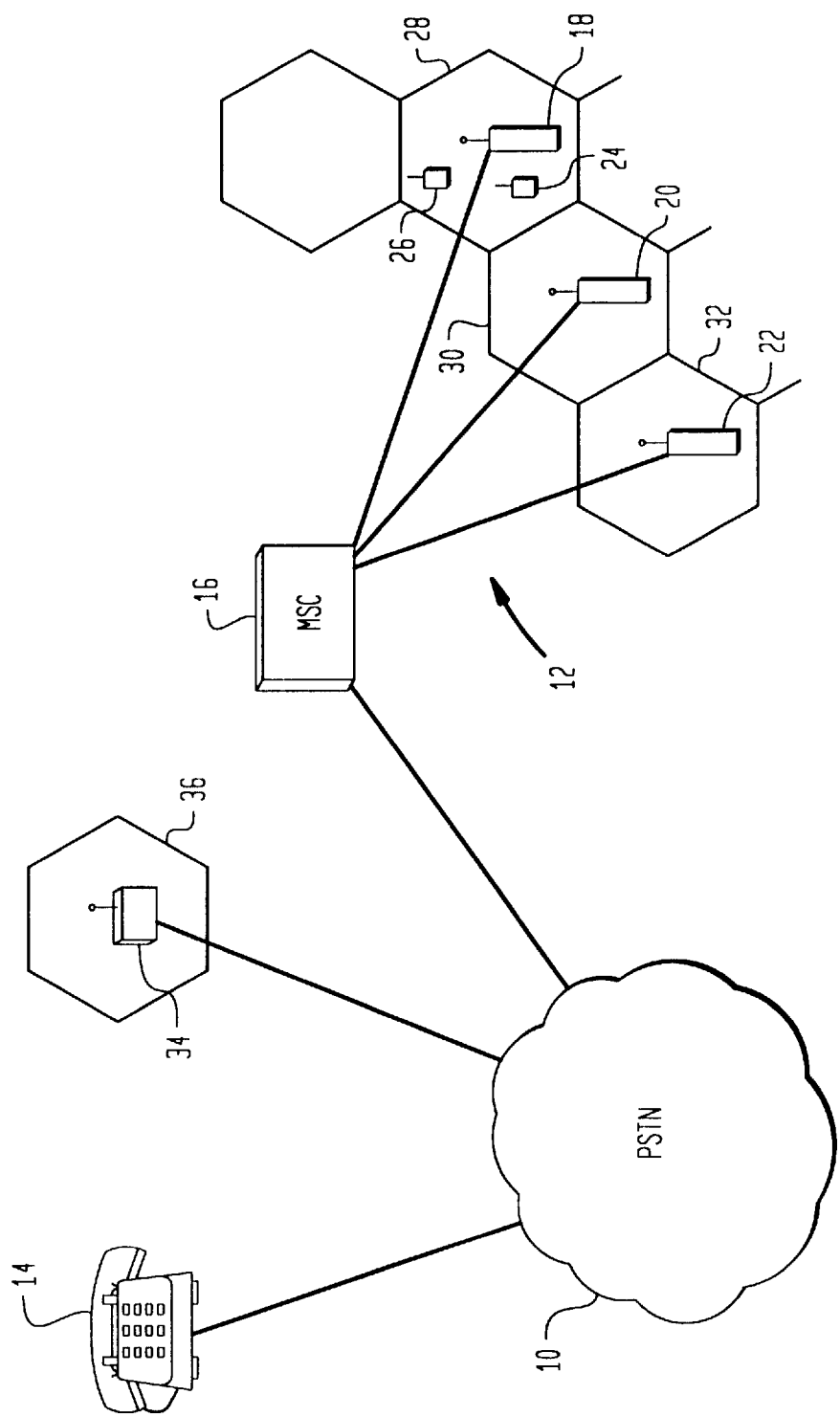
FIG. 1 illustrates an exemplary communication network including a wireless network, a public switched telephone network, and a personal base station.

FIG. 1 illustrates an exemplary communication network including a public switched telephone network ("PSTN") 10, a wireless network 12, and a personal base station 34. The PSTN 10 is an external communication network that typically includes a combination of local offices, toll offices and long distance networks (not shown) that provide telephone service over a substantial geographical region. The PSTN 10 may alternatively represent a subset of such a communication network. The PSTN 10 is operably connected to subscriber equipment of several network subscribers, including the exemplary subscriber set 14.

The above configuration is given by way of illustration only, and shows only the salient features of a communication network that are necessary to describe the context in which a PBS 34 operates.

The exemplary wireless network 12 illustrated in FIG. 1 includes a mobile switching center 16, a first base station 18, a second base station 20 and a third base station 22. The mobile switching center 16 is operably connected through voice and/or data trunks to each of the base stations 18, 20 and 22. The mobile switching center 16 is further operably connected to the PSTN 10. The wireless network 12 provides communication services to one or more wireless terminals. To this end, each base station services wireless terminals located within a prescribed service area. A base station services a wireless terminal by communicating call signals to and from the wireless terminal over a radio frequency pair. In particular, the first base station 18 services wireless terminals physically located within a first service area 28, which is loosely and symbolically defined as a hexagonal area surrounding the first base station 18. The second base station 20 services wireless terminals located within a similarly defined but geographical different second service area 30, and the third base station 22 services wireless terminals located within a third service area 32. It is noted that in practice the service areas are not strictly hexagonal and the service areas of more than one base station may overlap to some extent.

The PBS 34 according to the present invention is described further below. In general, the PBS 34 provides communication services to wireless terminals located with a PBS service area 36. The PBS service area 36 is typically smaller than the first, second or third service areas 28, 30 or 32, respectively, because the PBS 34 is designed for customer-premise use. The PBS 34 is further connected to the PSTN 10 to facilitate communication therewith.

In operation, the PSTN 10, the PBS 34 and the wireless network 12 coordinate to provide communications by and among subscribers or users thereof. For example, the PSTN 10 facilitates communication between the subscriber set 14 and other subscriber equipment connected to the PSTN 10, not shown. The PSTN 10 also facilitates communication between the subscriber set 14 and both the PBS 34 and the wireless network 12.

The operation of the wireless network 12 is described in the context of an exemplary telephone call between a party using a wireless terminal 26 and a party using the subscriber set 14. In such an example, the wireless terminal 26, which is located within the first service area 28 generates (and receives) call signals containing speech. The call signals are communicated between the wireless terminal 26 and the base station 18 using a selected radio frequency pair. The base station 18 further communicates the call signals to and from the mobile switching center 16, which in turn communicates the signals through the appropriate path to reach the other party to the call. For example, to effectuate the call with the subscriber set 14, the call signals from the wireless terminal 26 are provided from the base station 18 through the mobile switching center 16, through the PSTN 10, to the subscriber set 14.

The wireless network 12 is typically controlled or operated by a commercial entity which charges a per-call or per-minute fee for calls that utilize the services of the wireless network 12. It is noted that the PSTN 10 also typically charges a fee for calls that utilize its services and equipment. Accordingly, the exemplary call described above, as well as others like it, incur two separate fees.

The PBS 34 operates in a manner similar to that of the base stations 18, 20 and 22. Accordingly, a wireless terminal such as the wireless terminal 26 may communicate using the PBS 34 if it is physically moved to a location within the service area 36. As a result, a single wireless terminal may be used to communicate using both the PBS 34 and the wireless network 12. Because the PBS 34 is generally customer-premise equipment, owned or leased by the customer, there are typically no per-call or per-minute fees associated with its use.

Figure 2:
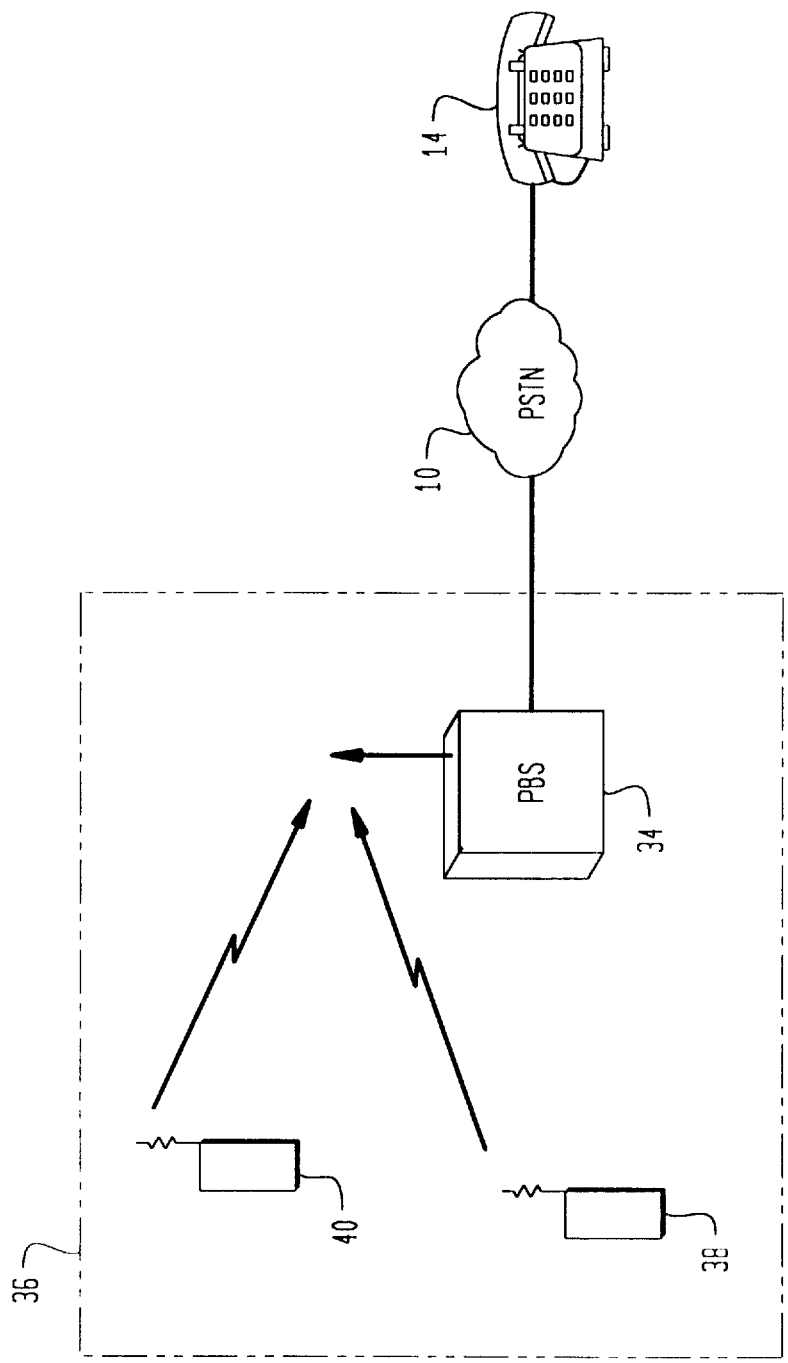
FIG. 2 illustrates an overview of an extension call between two wireless terminal users and an external communication network user according to the present invention.

FIG. 2 illustrates an exemplary extension calling arrangement between two wireless terminals communicating through the PBS 34 and another party connected to an external network. In the example illustrated in FIG. 2, the external network is the PSTN 10 from FIG. 1 and the other party is connected to the subscriber set 14 of FIG. 1. It will be noted however, that the PSTN 10 may be replaced or combined with another communication network, such as, for example, a wireless network or a private telephone network. Moreover, the other party may communicate through the external network using other means, such as another wireless terminal. It is assumed for the purposes of this embodiment that the PSTN 10 communicates using analog voice signals, and the PBS 34 communicates using rf signals that employ time division multiple access ("TDMA") modulation technology.

Located within the PBS service area 36 are the PBS 34 and first and second wireless terminals 38 and 40, respectively. The PBS 34, among other things, includes a processor, not shown, that is operable to effectuate PBS extension calling according to the present invention. In general, the PBS 34 enables the first and second wireless terminals 38 and 40, respectively, to maintain an extension call with a party connected to the external communication network and specifically, the subscriber set 14. According to the present invention and described more fully below, the processor of the PBS 34 need only perform a compression or decompression process on one of the parties' signals at any one time.

In operation, an extension call between the subscriber set 14 and the wireless terminals 38 and 40 typically originates with a point-to-point call between the subscriber set 14 and one of the wireless terminals 38 or 40. After the point-to-point call is originated, the other wireless terminal is then activated and added to the call. At that point, the first wireless terminal 38 communicates with the PBS 34 using a first wireless channel and the second wireless terminal 40 communicates with the PBS 34 using a second wireless channel. In wireless communication systems that utilize time division multiple access ("TDMA") modulation, the first and second wireless channels are communication channels defined by a frequency pair and a time slot. In the exemplary embodiment discussed herein, the first and second wireless channels will ordinarily use the same frequency pair, but use different time slots. Such frequency reuse reduces the cost and complexity of the radio equipment that is required within the PBS 34. In particular, if a single frequency pair is used to communicate with both the first and second wireless terminals 38 and 40, respectively, then the radio equipment within the PBS 34 need only tune to one frequency pair instead of multiple frequency pairs.

In general, the PBS 34 provides simplex PBS extension calling, wherein the PBS 34 receives call signals from each of the parties, but provides only one of the parties' signals to the other parties. The processing of the call signals to provide such extension calling is described in further detail below in connection with FIGS. 3 and 4.

Figure 3:
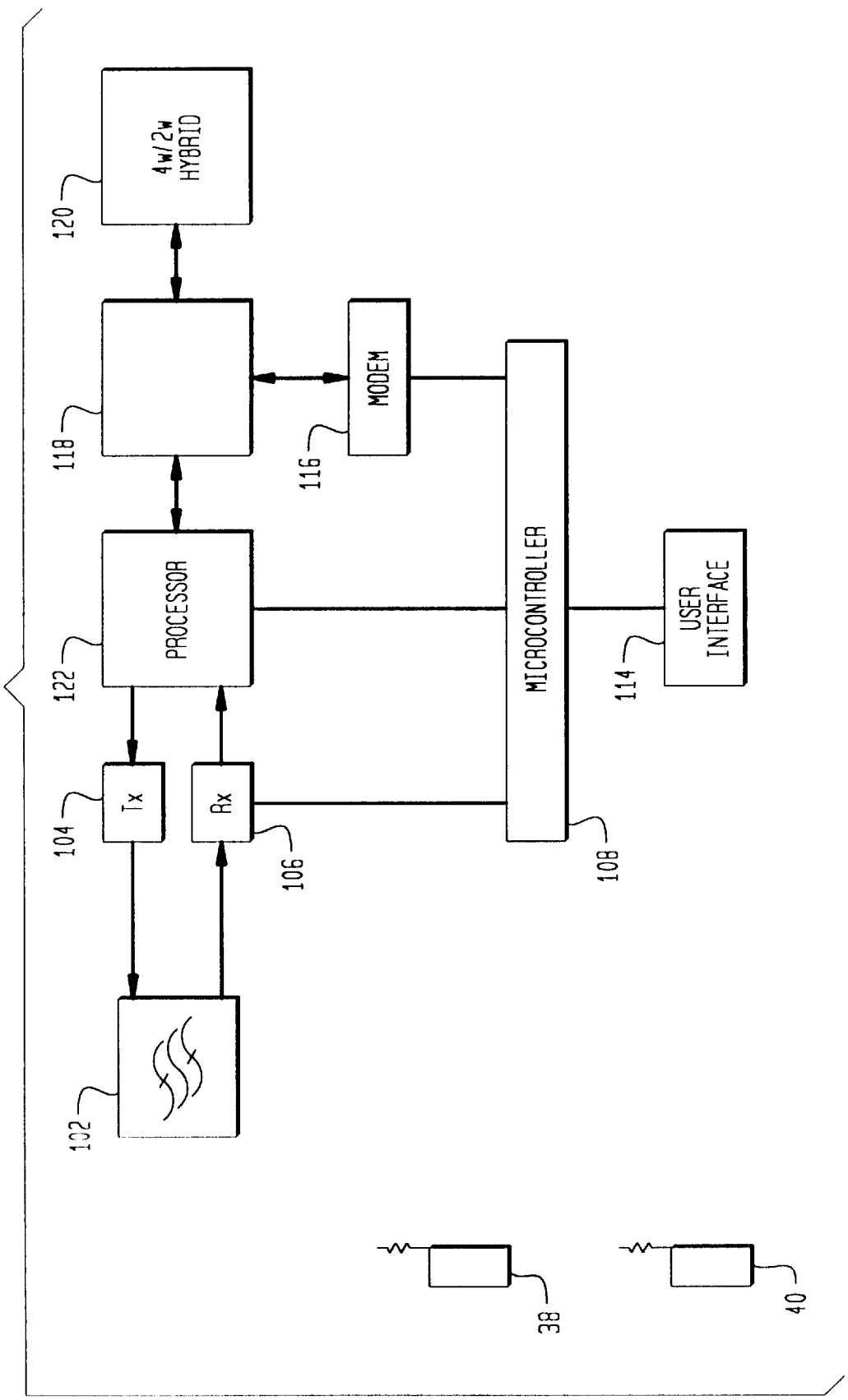
FIG. 3 illustrates a block diagram of a personal base station according to the present invention.

FIG. 3 illustrates a block diagram of a personal base station according to the present invention. In particular, FIG. 3 shows in further detail the PBS 34 of FIGS. 1 and 2. For purposes of clarity, the various components of the PBS in FIG. 3 are shown in block diagram form. Those of ordinary skill in the art could readily implement the corresponding detailed circuitry.

The PBS 34 includes an antenna 102, a transmitter 104, a receiver 106, a controller 108, a user interface 114, a modem 116, a switch 118, a hybrid network 120 and a digital signal processor 122. The antenna 102, which may suitably be a single antenna, is connected to the both the transmitter 104 and the receiver 106. To this end, a duplexer device may be used to connect the antenna 102 to both the transmitter 104 and receiver 106. The transmitter 104 has low output power, for example, 1 mW, and may therefore be similar to a transmitter found in a generally available cellular or portable telephone. Likewise, the receiver 106 may suitably be similar to a receiver found in a generally available portable telephone. The receiver 106, however, should have further functionality, including the ability to search for and monitor signals from base stations of a nearby wireless network, as called for in the technological specifications for PBS equipment, referred to as Telecommunications Industry Association Interim Standard—136 (February 1996) ("IS 136"). Such signal monitoring capabilities are outside the main scope of the present invention.

The transmitter 104 and receiver 106 are both connected to the controller 108, which controls their operation. The controller 108, in turn, is connected to the user interface 114. The user interface 114 obtains operational information from the controller 108 and provides status indicators and the like to the user. The user interface 114 may also include one or more input devices, such as push buttons, which allow the user to control to some extent the operation of the PBS 34.

The transmitter 104 and receiver 106 are further operably connected to the digital signal processor ("DSP") 122. The DSP 122 is also connected to the controller 108 and to the switch 118. The modem 116 is connected to the controller 108 and the switch 118. The switch 118 is further connected to the hybrid network 120. The hybrid network 120 is operably connected to the external network. In general, the switch 118 connects the modem 116 to the hybrid network 120 to perform call set up functions with the external network. Once a call has been set up and is in progress, the switch 118 connects the DSP 122 to the hybrid network 120.

In the operation of the PBS 34 under the conditions described above in connection with FIG. 2, and in particular, during an extension call between a first and second wireless terminal 38 and 40, respectively, and a party connected to the external network, not shown, the PBS 34 provides simplex operation as described below.

In general, the first wireless terminal 38 transmits a TDMA radio frequency signal containing a first signal to the antenna 102. The first signal is in compressed digital signal format and contains information representative of voice signals provided by the party that is using the first wireless terminal 38. The second wireless terminal 40 likewise transmits a TDMA radio frequency signal containing a second signal to the antenna 102. The second signal is also in a compressed digital signal format and contains information representative of voice signals provided by the party that is using the second wireless terminal 40. The compression method typically used in wireless telephony is code-excited linear predictable coding ("CELP"). A typical embodiment of a CELP coding technique is vector-sum excited linear prediction ("VSELP") encoding, which is further discussed in IS 136.

The antenna 102 receives and subsequently provides the TDMA radio frequency signals containing the first and second signals to the receiver 106. The receiver 106 performs known demodulation, frequency shifting, and amplification operations on the TDMA radio frequency signals in order to provide baseband versions of the first and second signals to the DSP 122.

From the external network side, the party connected to the external network provides a network signal to the hybrid network 120. The network signal is typically an analog or digital signal in uncompressed format. In this exemplary embodiment, the external network communicates with the hybrid network 120 in a similar manner as any public switched telephone network communicates with generally-available customer premise equipment, in other words, over a two-wire line. Accordingly, the hybrid network 120 converts the network signal from a form suitable for two-wire transmission to a form suitable for four-wire transmission, as is known in the art. The hybrid network 120 then provides the network signal through the switch 118 to the DSP 122.

Once the DSP 122 receives the first, second and network signals, the DSP 122 then provides a select one of the first signal, second signal, and network signal to a combination of the first wireless terminal, the second wireless terminal and external network to effectuate communications between and among those devices. To this end, the DSP 122 monitors the first, second and network signal and selects a priority signal therefrom. The network signal, if not already in digital signal format, must be converted to digital signal format to facilitate monitoring thereof. As described below, such conversion is readily carried out by well known analog to digital conversion techniques.

To select a priority signal, the DSP 122 monitors an energy level of each of the first signal, the second signal, and the network signal. Essentially, the DSP 122 monitors the three signals to detect whether any of the first, second or external signals indicate the presence of active conversation, or in other words, whether each signal has an energy level that exceeds a predetermined threshold. The threshold comprises a boundary that separates energy levels indicative of active conversation from energy levels indicative of silence, and may be determined empirically by those of ordinary skill in the art.

The DSP 122 then uses predetermined criteria to select the priority signal from the first signal, the second signal and the network signal. In the present embodiment, the predetermined criteria is dependent upon the energy levels of the signals. In general, the DSP 122 selects a signal that has an energy level that exceeds the predetermined threshold. If more than one signal has an energy level exceeding the threshold, one of those signals is selected either randomly or using some other criteria. The selection of the priority signal is discussed in further detail below in connection with FIG. 4.

Once the priority signal has been selected, the DSP 122 provides the priority signal to at least two of the first wireless terminal, second wireless terminal and external communication network. In particular, the DSP 122 provides the priority signal to at least the two parties that did not originate the priority signal. To do so, the DSP performs either a compression or decompression process to the priority signal.

Specifically, if the priority signal is either the first or second signal, which are in compressed format, then the DSP 122 first performs a decompression process before providing it to the external network. To provide the priority signal to the external network, the DSP 122 provides the priority signal through the switch 118 to the hybrid network 120. The hybrid network 120 converts the priority signal from a form suitable for four-wire transmission to a form suitable for two-wire transmission, and then provides the resulting signal to the external network.

In addition, if the priority signal is the first signal, then the unprocessed priority signal, which is in compressed format, is provided directly to the second wireless terminal 40, and may be returned to the first wireless terminal 38 as a form of feedback sometimes referred to as sidetone. Likewise, if the priority signal is the second signal, the unprocessed priority signal is provided directly to the first wireless terminal 38 and optionally to the second wireless terminal 40.

If, however, the priority signal is the external signal, which is in decompressed format, then the DSP 122 performs a compression process before providing the priority signal to the first and second wireless terminals 38 and 40, respectively. To provide the priority signal to the first wireless terminal 38 and second wireless terminal 40, the DSP 122 provides the priority signal to the transmitter 104. The transmitter 104 then performs modulation, frequency shifting, and amplification operations on the priority signal to create a TDMA radio frequency signal containing the priority signal. The transmitter provides the radio frequency signal to the antenna 102. The antenna 102 then provides the radio frequency signal to the first and second wireless terminals 38 and 40, respectively.

Thus, the above embodiment provides a method by which a PBS can support a three-way call, or extension call, that involves two wireless terminals and an external network-based party. The above embodiment uses a simplex protocol, where only one party "speaks" at a time, in order to effectuate the extension call while minimizing the processing requirements. In contrast, full duplex conference calling requires excessive processing power to achieve the necessary compression and decompression. The present invention reduces the required amount of computations for processing such an extension call to a level approximately equivalent to that required for an ordinary telephone call involving one wireless terminal. As a result, the cost of PBS equipment capable of providing extension calling is reduced. In addition, the reduction of the quantity of compression/ decompression processing tends to reduce the amount of signal degradation, thus providing higher quality voice communication.

Figure 4:
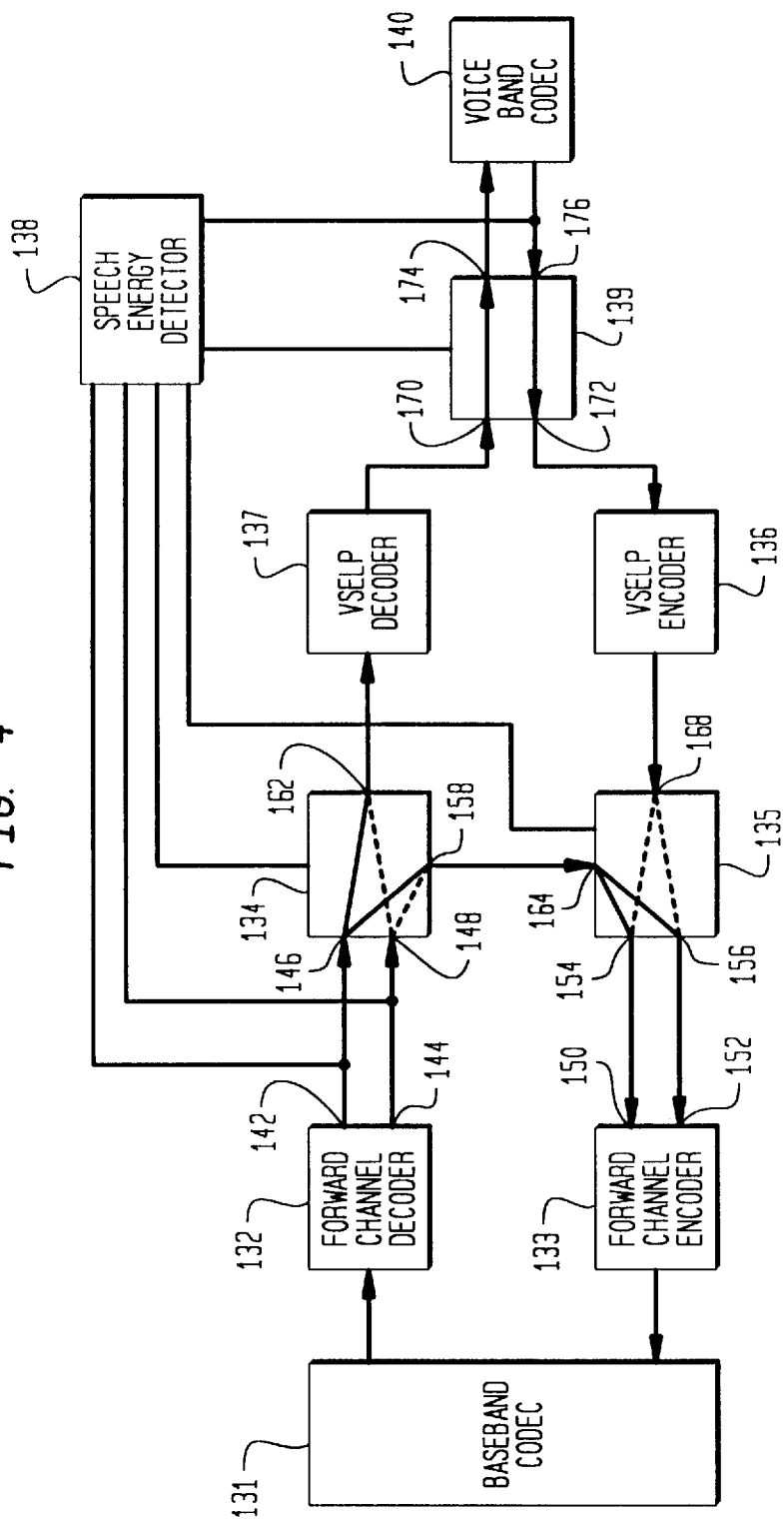
FIG. 4 illustrates a functional block diagram of a processor used in a personal base station in accordance with the present invention.

FIG. 4 shows in further detail a processor operating according to the present invention, and illustrates further the computational savings provided by the present invention. The exemplary processor shown in FIG. 4 may suitably be the DSP 122 from FIG. 3. The DSP 122 is illustrated in FIG. 4 as a plurality of interconnected functional blocks. Ordinarily, however, the functions performed by the various blocks are coded into computer software. The DSP 122 may suitably be a two chip combination of a model 1627 DSP available from AT&T Corp. (or Lucent Technologies) and an ARCTIC chip available from Texas Instruments. The two chip embodiment of the DSP 122 would then operate by executing program code to carry out the functions of the block diagram circuit in FIG. 4.

In any event, the DSP 122 includes a baseband codec 131, a forward channel decoder 132, a forward channel encoder 133, a first simplex switch 134, a second simplex switch 135, a VSELP encoder 136, a VSELP decoder 137, a speech energy detector 138, a network simplex switch 139, and a voice band codec 140.

The baseband codec 131 is connected to a transmitter and receiver circuit, not shown, which may suitably be the transmitter 104 and receiver 106 from FIG. 4. The baseband codec 131 is otherwise operably connected to both the forward channel decoder 132 and the forward channel encoder 133. The baseband codec 131 is operable to perform convolution code encoding and decoding according to the specifications for standard digital wireless telephony, referenced in IS 136. The baseband codec 131 in the exemplary embodiment is also operable to perform pi/4 differential quadrature phase shift keying in accordance with the specifications for standard digital wireless telephony. The baseband codec 131 may suitably be an ARCTIC integrated circuit.

The remaining functional elements of FIG. 4 may be realized through a suitably programmed digital signal processor ("DSP"), such as a model 1627 DSP available from Lucent Technologies. Those of ordinary skill in the art may readily devise suitable program code to carry out the described function. Alternatively, suitable hardware equivalents for each of the individual elements illustrated in FIG. 4 may be employed, and would be readily apparent to those of ordinary skill in the art.

Referring now to the remaining elements of FIG. 4, the forward channel decoder 132 is a pi/4 differential quadrature phase shift key demodulator ("DQPSK") and forward channel error code decoder. The DQPSK demodulator functionality complements the corresponding DQPSK functionality described above in connection with the baseband codec 131. The forward channel error code decoder functionality is well-known in the digital wireless telephony industry. The forward channel decoder 132 has first and second outputs 142 and 144, respectively, which are connected to first and second inputs 146 and 148, respectively, of the first simplex switch 134. The first simplex switch 134 also includes a feedback output 158 and a decoder output 162. The first simplex switch 134 is operable to selectively enable the either of the first input 146 or second input 148. When the first input 146 is enabled, the first simplex switch 134 provides signals received at the first input 146 to both of the feedback output 158 and the decoder output 162. When the second input 148 is enabled, the first simplex switch 134 provides signals received at the second input 148 to each of the feedback output 158 and the decoder output 162.

The forward channel encoder 133 is a forward channel error code encoder, and has first and second inputs 150 and 152, respectively, that are operably connected to first and second outputs 154 and 156, respectively, of the second simplex switch 135. The second simplex switch 135 also includes a feedback input 164 and an encoder input 168. The feedback input 164 is connected to the feedback output 158. The second simplex switch 135 is operable to selectively enable either the feedback input 164 or the encoder input 168. When either of the feedback input 164 or encoder input 168 is enabled, that input is operably connected to both the first output 154 and second output 156.

The VSELP encoder 136 and VSELP decoder 137 carry out the computationally-intensive tasks of VSELP coding, which is a form of digital data compression and decompression. Digital data is typically compressed to conserve transmission bandwidth. In VSELP coding, a digital signal is partitioned into temporal segments, or windowed, and various spectral qualities, including energy, of the signal within the temporal segment are assessed and quantified. The quantified spectral qualities are represented as coefficients of a mathematical series. The resulting compressed digital signal therefor comprises, among other things, a plurality of the spectral energy coefficients. The VSELP decoder 137 may suitably by any known VSELP decoding device or algorithm that is well-known in the field of digital wireless telephony. The VSELP encoder 136 may suitably by any known VSELP encoding device or algorithm that is also well-known.

The VSELP decoder 137 is connected to the decoder output 162 of the first simplex switch 134 and a wireless input 170 of the network simplex switch 139. The VSELP encoder 136 is connected to the encoder input 168 of the second simplex switch 135 and a wireless output 172 of the network simplex switch 139. The network simplex switch 139, in addition to the wireless input 170 and wireless output 172, further comprises a network output 174 and network input 176. The network input switch 139 is operable to selectively enable a path between the wireless input 170 and network output 174, or a connection between the network input 176 and wireless output 172.

The speech energy detector 138 is a control mechanism that monitors signals received from two wireless terminals and one external network connection, and then controls the operation of the first simplex switch 134, second simplex switch 135, and network simplex switch 139 in order to carry out a simplex extension calling method according to the present invention. To facilitate its signal monitoring operations, the speech energy detector 138 is operably connected to the first and second outputs 142 and 144, respectively, of the forward channel decoder 132, as well as the network input 176 of the network simplex switch 139. To facilitate its control of the various switching devices, the speech energy detector 138 is further connected to each of the first simplex switch 134, the second simplex switch 135, and the network simplex switch 139.

The general operation of the circuit of FIG. 4 is described herebelow in connection with an extension call involving two wireless terminals and a party connected to the external telephone network. The first wireless terminal 38 (see FIG. 3) provides the first signal to the baseband codec 131 via the various elements of the PBS described above in connection with FIG. 3. The second wireless terminal 40 (see FIG. 3) provides the second signal to the baseband codec 131 in a similar manner. The external network likewise provides the network signal to the voice band codec 140 through the various elements of the PBS described above in connection with FIG. 3.

The baseband codec 131 processes the first and second signals by convolution code decoding the signals. The forward channel decoder 132 then receives the resulting convolution code-decoded first and second signals and further processes those signals. In particular, the forward channel decoder 132 performs pi/4 DQPSK demodulation and forward error channel code decoding as is known in the art. The forward channel decoder 132 then provides the demodulated and decoded first signal to the first output 142 and provides the demodulated and decoded second signal to the second output 144. As a result, the first input 146 of the first simplex switch 134 receives the first signal and the second input 148 receives the second signal. In addition, the speech energy detector 138 receives decoded and demodulated versions of both the first and second signal.

Concurrently, the voice band codec 140 receives the network signal, which is the form of an analog signal. The voice band codec 140 samples and otherwise converts the signal to an uncompressed digital signal, typically a straight-sampled signal or mu-law sampled signal, and provides the resulting uncompressed digital network signal to the network input 176 of the network simplex switch 139. The uncompressed digital network signal is further provided to the speech energy detector 138.

The speech energy detector 138 then monitors the first, second, and network signals and selects a priority signal therefrom. In essence, the first, second, and network signals are monitored to determine whether there is active speech present on those signals, and the priority signal is selected from among any signals that contain active speech. To this end, the present embodiment of the speech energy detector 138 obtains an energy level associated with each signal and compares those energy levels to a threshold value.

Energy level measurements from the first and second signals are facilitated by their VSELP encoded format. As described briefly above, a VSELP encoded signal includes a series of coefficients that relate to energy and spectral qualities of the signal for a preselected window of the signal. One VSELP coefficient that contains a measure of energy that tracks the presence of speech is the R0 coefficient. Accordingly, to obtain the energy level of the first and second signals, the speech energy detector 138 retrieves the R0 coefficients from the first and second signals on a running basis, or at regular intervals. In addition, the speech energy detector 138 monitors the energy of the network signal. To this end, the speech energy detector 138 averages the amplitude of a number of samples of the network signal. The average amplitude may then be updated on a running basis or at regular intervals.

Figure 5:
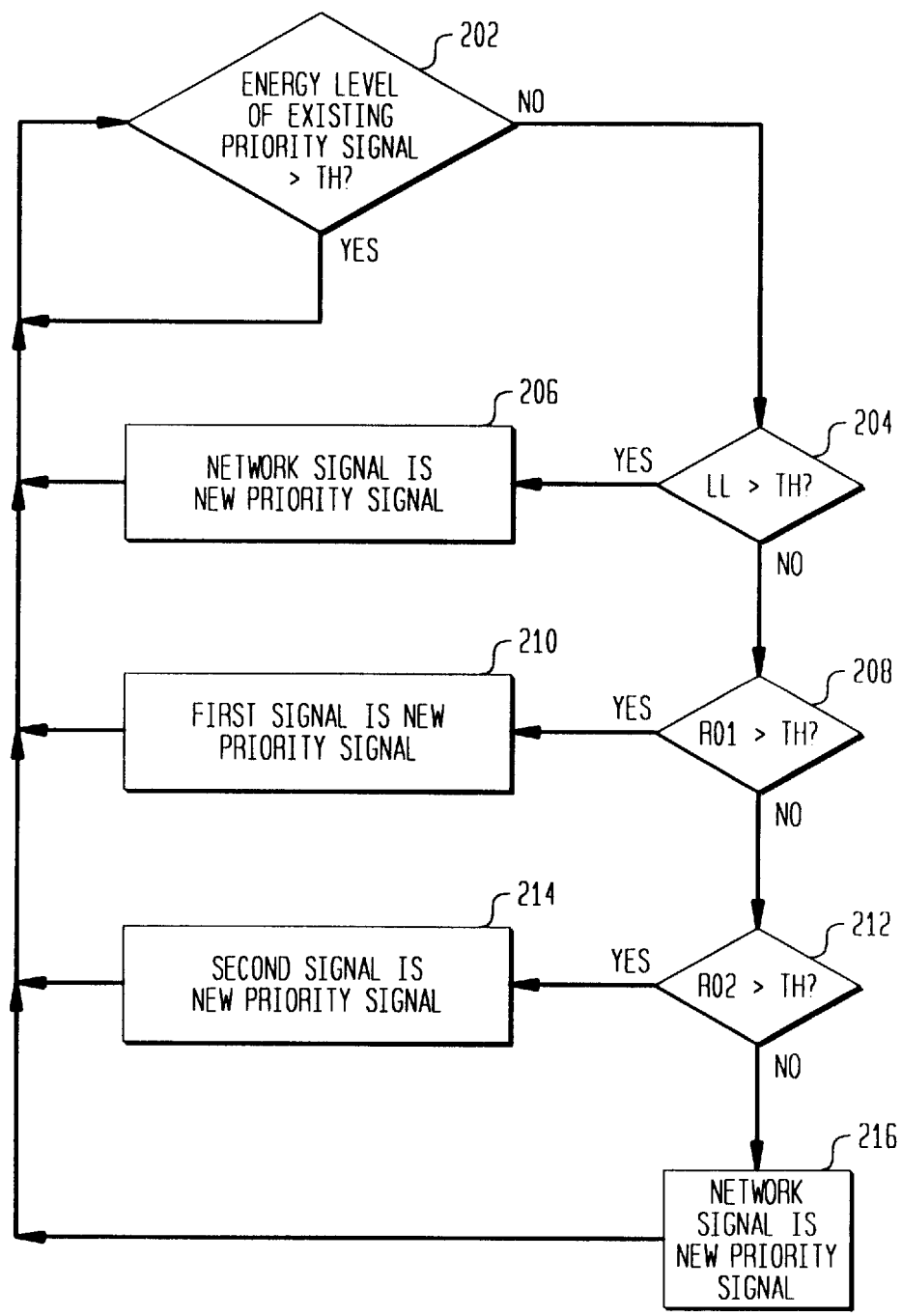
FIG. 5 illustrates a block diagram of an exemplary process for selecting a priority signal according to the present invention.

The speech energy detector 138 then uses the relative energy levels of the first, second and network signals to select the priority signal therefrom. While an exemplary selection process is illustrated in FIG. 5 and discussed below, in general, the selection of the priority signal is based on which of the first, second or network signals has an energy level that exceeds the threshold energy level. The selection of a priority signal is repeated or updated frequently, for example, every 20 ms.

The speech energy detector 138 then provides appropriate control signals to each of the first simplex switch 134, the second simplex switch 135 and the network switch 139 depending on which signal is selected to be the priority signal. The control signals operate to configure the switches to propagate the priority signal to at least the two other parties of the call.

In particular, if the first signal is selected as the priority signal, then the speech energy detector provides control signals that: enable the first input 146 and disable the second input 148 of the first simplex switch 134; enable the feedback input 164 and disable the encoder input 168 of the second simplex switch 135; and enable both the wireless input 170 and network output 174 and disable both the network input 176 and wireless output 172 of the network simplex switch 139.

With the above configuration, the priority signal propagates through the first simplex switch 134 to both the feedback input 164 of the second simplex switch 135 and the decoder output 162. The second simplex switch 135 provides the priority signal to its first and second outputs 154 and 156, respectively. The priority signal thereafter propagates to the first and second inputs 150 and 152, respectively, of the forward channel encoder 133. The forward channel encoder 133 and, subsequently, the baseband codec 131, process the network signal appearing at first input 150 in a manner appropriate for subsequent transmission to the first wireless terminal 38. To this end, the forward channel encoder 133 performs forward channel error code encoding while the baseband codec 131 performs pi/4 DQPSK modulation and convolution code encoding on the priority signal. In a similar manner, the forward channel encoder 133 and the baseband codec 131 process the network signal appearing at the second input 152 in a manner appropriate for subsequent transmission to the second wireless terminal 40.

Contemporaneous with the provision of the priority signal to the first and second wireless terminals, the VSELP decoder 137 receives and decompresses the network signal appearing and the decoder output 162. To this end, the VSELP decoder 137 converts the compressed, VSELP encoded signal to a mu-law or straight sampled digital signal. Processes for providing such conversion are well-known. The VSELP decoder 137 thereafter provides the resulting decompressed version of the priority signal to the voice band codec 140 through the network simplex switch 139 via the wireless input 170 and network output 174. The voice band codec 140 then converts the decompressed digital priority signal to an analog signal which may then be provided to the external network.

It is noted that when, as above, the priority signal is the first signal, the first simplex switch 134 does not propagate the second signal through to either the second simplex switch 135 or the VSELP decoder 137. Accordingly, the second signal is not processed or provided to any of the parties to the call. Likewise, the network simplex switch, by disabling the network input 176, prevents the network signal from being processed by the VSELP encoder 136 or propagating to the other parties to the call.

If, instead of the first signal, the second signal is selected as the priority signal, then the speech energy detector 138 provides control signals that: enable the second input 148 and disable the first input 146 of the first simplex switch 134; enable the feedback input 164 and disable the encoder input 168 of the second simplex switch 135; and enable both the wireless input 170 and the network output 174 and disable both the network input 176 and the wireless output 172 of the network simplex switch 139.

With the above switch configuration, the second signal, now the priority signal, propagates to the feedback output 158 and the encoder output 162. The second simplex switch 135 receives through the feedback input 164 the priority signal appearing at the feedback output 158 of the first simplex switch 134. The second simplex switch 135 thereafter provides the priority signal to its first and second outputs 154 and 156, respectively. Otherwise, the priority signal is processed in the same manner as described above in the case in which the first signal was the priority signal.

If, however, the network signal is the priority signal, then the speech energy detector 138 provides control signals that: disable both the first input 146 and second input 148 of the first simplex switch 134; enable the encoder input 168 and disable the feedback input 164 of the second simplex switch 135; and enable both the network input 176 and the wireless output 172 and disable both the wireless input 170 and network output 174 of the network simplex switch 139.

The network signal, or priority signal, located at the network input 176 of the network simplex switch 139, propagates through its wireless output 172 to the VSELP encoder 136. The VSELP encoder 136 performs a compression process on the priority signal and then provides the compressed priority signal to the encoder input 168 of the second simplex switch 135. The second simplex switch 135 provides the compressed priority signal to its first and second outputs, 154 and 156, respectively. From that point, the priority signal is processed in the same manner as described above in the case in which the network signal was the first signal.

When the network signal is the priority signal, neither input of the first simplex switch 134 is enabled. As a result, neither the first signal nor the second signal are processed by the VSELP decoder 137 or provided to any of the parties to the call.

As discussed above, only one VSELP encoding or decoding step, or in other words, only one of either a compression or decompression process, is performed on one signal of the extension call at any one time. If the priority signal is the first or second signal, then a single decompression process is performed before providing the priority signal to the external network. If the priority signal is the network signal, then a single compression process is performed before providing the priority signal to the first and second wireless terminals. By requiring only one VSELP encoding or decoding process to be performed at a time, the physical embodiment of the DSP 122 may be a device or circuit of reduced expense and complexity.

FIG. 5 illustrates a block diagram of an exemplary process for selecting the priority signal. In the embodiment described in connection with FIG. 4, the speech energy detector 138 may suitably carry out the process illustrated on FIG. 5. In the block diagram, the variable LL represents the normalized speech energy of the network signal, which may be measured from the network input 176 of FIG. 4. The variable R01 represents the normalized speech energy of the first signal, which may be measured from the forward channel decoder first output 142. The variable R02 represents the normalized speech energy of the second signal, which may be measured from the forward channel decoder second output 144. The variable TH represents the normalized speech energy threshold. In general the speech energy threshold represents the boundary between signal energy levels that are indicative of active speech and no speech. For example, when a party is speaking, the energy level of their voice signal would exceed the threshold. When that same party is silent, the energy level of their voice signal would fall below the threshold. The threshold may be determined empirically by those of ordinary skill in the art.

In step 202, it is first determined if the energy level of the existing priority signal exceeds the threshold. If so, then the existing priority signal remains the priority signal and control remains at step 202. If not, however, then control is passed to step 204. In step 204, it is determined whether LL>TH. If so, then control passes to step 206 in which the network signal becomes the new priority signal. After step 206, control returns to step 202. If, however, in step 204, it is determined that LL<=TH, then control passes to step 208, in which it is determined whether R01>TH. If R01>TH, then control passes to step 210 in which the first signal becomes the new priority signal. After step 210, control returns to step 202. If R01<=TH, however, then control passes to step 212, in which it is determine whether R02>TH. If R02>TH, then control passes to step 214 in which the second signal becomes the new priority signal.

If, in step 212, it is determined that R02<=TH, and at that point it is already known that R01<=TH and LL<=TH, then control passes to step 216. In step 216, the network signal becomes the priority signal. After step 216, control returns to step 202.

In general, the above flow diagram attempts to select as the priority signal a signal that contains active speech. If more than one signal contains active speech, preference is given to the network signal, and then to the first signal. If no signal contains active speech, then the network signal is selected to be the priority signal. The preference given to the network signal is clearly a matter of design choice. Moreover, any preference of the first signal over the second signal in the above-described embodiment represents a random selection. Particular implementations may of course require certain signal preferences which may be accommodated by simple modifications of the flow diagram in FIG. 5.

It is to be noted that the above described embodiments are merely illustrative. Those of ordinary skill in the art may readily devise their own implementations that incorporate the principles of the present invention and fall within the spirit and scope thereof. For example, while the embodiments described above involve wireless terminals that communicate using TDMA radio frequency signals, the present invention is equally applicable to other wireless signal formats including, for example, CDMA radio frequency signals. Those of ordinary skill in the art may readily modify the devices described in connection with FIGS. 3 and 4 to accommodate CDMA technology. Moreover, while the above described embodiments contemplates the use of VSELP compression techniques, the principles of the present invention are applicable to embodiments using other compression techniques, including other CELP techniques such as algebraic code-excited linear predictive coding. For such other compression techniques, speech energy must be calculated because such techniques do not have a coefficient analogous to the R0 speech energy coefficient of VSELP encoded signals. Those of ordinary skill in the art may readily devise methods of determining speech energy from a particular compression scheme.

We claim:

1. A digital signal processor for use in a base station, said base station operable to communicate with at least first and second wireless terminals using radio frequency signals, said base station further operable to communicate with an external network to facilitate a call between one or more wireless terminals and party connected to the external network, said digital signal processor operably connected to receive signals from and provide signals to the first and second wireless terminals and further operably connected to receive signals from and provide signals to the external network, said digital signal processor programmed to execute instructions to perform the following functions:

a) monitor a first signal, the first signal being in compressed digital signal format and received from the first wireless terminal;

b) monitor a second signal, the second signal being in compressed digital signal format and received from the second wireless terminal;

c) monitor a network signal, the network signal being in uncompressed digital signal format and received from the external network;

d) select using predetermined criteria a priority signal, said priority signal comprising one of the first signal, the second signal and the network signal; and e) perform either a compression or decompression process on the priority signal and provide the processed priority signal to at least one of the first wireless terminal, second wireless terminal and external communication network.

2. The digital signal processor of claim 1 further programmed to execute instructions to select the priority signal based in part on whether an energy level of the network signal, an energy level of the first signal, and an energy level of the second signal exceeds a predetermined threshold.

3. The digital signal processor of claim 2 further programmed to execute instructions to select the priority signal to comprise the network signal based in part on whether the energy level of the network signal exceeds the predetermined threshold.

4. The digital signal processor of claim 2 further programmed to execute instructions to select the priority signal based in part on whether an energy level of an existing priority signal exceeds the predetermined threshold.

5. The digital signal processor of claim 1 further programmed to monitor the first signal and the second signal, wherein the first signal and the second signal are in a code-excited linear predictive ("CELP") encoded format.

6. The digital signal processor of claim 1 further programmed to execute instructions to perform a compression process utilizing a CELP encoding process, and perform a decompression process utilizing a CELP decoding process.

7. The digital signal processor of claim 1 further programmed to execute instructions to perform forward channel error code decoding on signals received from the first wireless terminal to produce the first signal therefrom, perform forward channel error code decoding on signals received from the second wireless terminal and produce the second signal therefrom, and forward channel error code encoding on the priority signal.

8. The digital signal processor of claim 1 further programmed to execute instructions to perform a decompression process on the priority signal if the priority signal comprises the first signal.

9. The digital signal processor of claim 1 further programmed to execute instructions to perform a compression process on the priority signal if the priority signal comprises the network signal.

10. A method of signal processing for use in a base station, said base station operable to communicate with at least first and second wireless terminals using radio frequency signals, said base station further operable to communicate with an external network to facilitate a call between one or more wireless terminals and another party connected to the external network, said method comprising:

a) receiving a first signal from the first wireless terminal, the first signal having an energy level;

b) receiving a second signal from the second wireless terminal, the second signal having an energy level;

c) receiving a network signal from the external network, the network signal having an energy level;

d) selecting a priority signal, said priority signal comprising one of the first signal, the second signal and the network signal, said selection based in part on the first signal energy level, the second signal energy level, and the network signal energy level; and e) providing the priority signal to at least two of the first wireless terminal, second wireless terminal and external communication network, wherein said priority signal is provided to the external network in an uncompressed format and said priority signal is provided to the first and/or second wireless terminal in a compressed format.

11. The method of claim 10 wherein step d) further comprises selecting the priority signal based in part on whether the network signal energy level, the first signal energy level, or the second signal energy level exceeds a predetermined threshold.

12. The method of claim 11 wherein step d) further comprises selecting the priority signal to comprise the network signal based in part on whether the network signal energy level exceeds the predetermined threshold.

13. The method of claim 10 wherein step d) further comprises selecting the priority signal only if an existing priority signal energy level is equal to or less than a predetermined threshold.

14. The method of claim 10 wherein step e) further comprises providing the priority signal to the first and second wireless terminals if the priority signal comprises the network signal, and providing the priority signal to at least the external network if the priority signal comprises the first or second signal.

15. The method of claim 10 wherein the first signal comprises a vector-sum excited linear prediction ("VSELP") encoded signal and step a) further comprises obtaining the first signal energy level from at least one R0 coefficient from the first signal and wherein the second signal comprises a VSELP encoded signal and step b) further comprises obtaining the second signal energy level from at least one R0 coefficients from the second signal.

16. The method of claim 10 wherein the network signal comprises a sampled digital signal and step c) further comprises obtaining the network signal energy level by determining an average amplitude of the network signal.

17. The method of claim 10 wherein step d) further comprises first extracting data indicative of the first signal energy level from the first signal, extracting data indicative of the second signal energy level from the second signal, and extracting data indicative of the network signal energy level from the network signal, and then selecting the priority signal based in part on the extracted data.

18. The method of claim 17 wherein the first signal and the second signal are VSELP encoded signals and step d) further comprises extracting data indicative of the first signal energy level by obtaining a first energy level coefficient from the first signal and extracting data indicative of the second signal energy level by obtaining a second energy level coefficient from the second signal.

19. The method of claim 17 wherein step d) further comprises extracting the network signal energy level by obtaining the average amplitude of the network signal.

20. A base station operable to communicate with at least first and second wireless terminals using radio frequency signals, said base station further operable to communicate with an external network to facilitate a call between one or more wireless terminals and another party connected to the external network, the base station comprising:

a) a transmitter for transmitting radio frequency signals to said first and second wireless terminals;

b) a receiver for receiving radio frequency signals from said first and second wireless terminals;

c) a network interface for receiving signals from the external network and for providing signals to the external network;

d) a processor operably connected to the transmitter, the receiver and the network interface, said processor operable to:

monitor a first signal, the first signal associated with the first wireless terminal and being in compressed digital format;

monitor a second signal, the second signal associated with the second wireless terminal and being in compressed digital format;

monitor a network signal, the network signal associated with the external network and being in uncompressed digital format;

select using predetermined criteria a priority signal, said priority signal comprising one of the first signal, the second signal and the network signal; and perform a compression or decompression process on the priority signal and provide the processed priority signal to at least one of the first wireless terminal, second wireless terminal and external network.

21. The base station of claim 20 wherein the processor is further operable to perform a CELP compression or decompression process on the priority signal.

22. The base station of claim 20 wherein the processor includes a digital signal processor that is further operable to perform forward channel error code decoding and pi/4 differential quadrature phase shift key demodulation.

23. The base station of claim 20 wherein the processor is further operable to select the priority signal based in part on whether an energy level of the network signal, an energy level of the first signal, or an energy level of the second signal exceeds a predetermined threshold.

24. The base station of claim 23 wherein the processor is further operable to select the priority signal to comprise the network signal based in part on whether the energy level of the network signal exceeds the predetermined threshold.

25. The base station of claim 23 wherein the processor is further operable to select the priority signal based in part on whether an energy level of an existing priority signal exceeds the predetermined threshold.

26. The base station of claim 20 wherein the processor is further operable to perform a decompression process on the priority signal if the priority signal comprises the first signal.

27. The base station of claim 20 wherein the processor is further operable to perform a compression process on the priority signal if the priority signal comprises the network signal.

28. The base station of claim 20 wherein the network interface further comprises:

a hybrid network connected to the external network;

a modem for performing call initiation functions; and a switch for selectively and alternatively connecting the processor or the modem to the hybrid network.

29. A base station operable to communicate with at least first and second wireless terminals using radio frequency signals, said base station further operable to communicate with an external network to facilitate a call between one or more wireless terminals and another party connected to the external network, said base station comprising:

a) a transmitter for transmitting radio frequency signals to said first and second wireless terminals;

b) a receiver for receiving radio frequency signals from said first and second wireless terminals;

c) a network interface for receiving signals from the external network and providing signals to the external network;

d) a processor operably connected to the transmitter, the receiver, and the network interface, said processor operable to:

monitor a first signal, the first signal received from the first wireless terminal;

monitor a second signal, the second signal received from the second wireless terminal;

monitor a network signal, the network signal received from the external network;

select using predetermined criteria a priority signal, said priority signal comprising one of the first signal, the second signal and the network signal; and perform a compression or decompression process on only the priority signal and provide the processed priority signal to at least one of the first wireless terminal, the second wireless terminal and the external network.

* * * * *